(12) United States Patent
Takehiro et al.

(10) Patent No.: US 8,221,932 B2
(45) Date of Patent: Jul. 17, 2012

(54) FUEL CELL

(75) Inventors: Naoki Takehiro, Shizuoka-ken (JP); Shinji Jomori, Susono (JP); Takumi Taniguchi, Susono (JP); Keiichi Kaneko, Fuji (JP); Tatsuya Arai, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/145,962

(22) PCT Filed: Jan. 20, 2010

(86) PCT No.: PCT/JP2010/000297
§ 371 (c)(1),
(2), (4) Date: Sep. 21, 2011

(87) PCT Pub. No.: WO2010/084745
PCT Pub. Date: Jul. 29, 2010

(65) Prior Publication Data
US 2012/0003562 A1 Jan. 5, 2012

(30) Foreign Application Priority Data
Jan. 23, 2009 (JP) .................................. 2009-13220

(51) Int. Cl.
*H01M 8/02* (2006.01)
*H01M 8/04* (2006.01)
*H01M 8/10* (2006.01)

(52) U.S. Cl. ........................................ 429/457; 429/514

(58) Field of Classification Search ........................ None
See application file for complete search history.

(56) References Cited

U.S. PATENT DOCUMENTS

| | | | |
|---|---|---|---|
| 2005/0255366 A1* | 11/2005 | Tighe ............................... | 429/38 |
| 2008/0292938 A1* | 11/2008 | Perry et al. ....................... | 429/34 |
| 2009/0110991 A1* | 4/2009 | Peng et al. ....................... | 429/30 |
| 2011/0123896 A1* | 5/2011 | Jomori et al. .................... | 429/482 |

FOREIGN PATENT DOCUMENTS

| | | |
|---|---|---|
| JP | 11-16591 A | 1/1999 |
| JP | 2003-317747 A | 11/2003 |
| JP | 2006-4638 A | 1/2006 |
| JP | 2006-114414 A | 4/2006 |
| JP | 2006-127770 A | 5/2006 |
| WO | 2008/056518 A1 | 5/2008 |

* cited by examiner

*Primary Examiner* — John S Maples
(74) *Attorney, Agent, or Firm* — Sughrue Mion, PLLC

(57) ABSTRACT

A fuel cell 10 includes an MEA 200, an anode separator 100 and a cathode separator 300. The anode separator 100 forms alternate first and second flow channels 110 and 120. The first flow channel 110 is blocked in the middle. The second flow channel 120 is blocked in the both ends. The anode separator 300 forms alternate first and second flow channels 310 and 320. The first flow channel 310 is blocked in the middle. The second flow channel 320 is blocked in the both ends.

3 Claims, 4 Drawing Sheets

FUEL CELL

CROSS REFERENCE TO RELATED APPLICATION

This application is a National Stage of International Application No. PCT/JP2010/000297 filed Jan. 20, 2010, claiming priority based on Japanese Patent Application No. 2009-13220, filed Jan. 23, 2009, the contents of all of which are incorporated herein by reference in their entirety.

TECHNICAL FIELD

The invention relates to a fuel cell that generates electricity electrochemically using a fuel gas and an oxidation gas (herein these gases shall be collectively termed "reactant gas"), and relates in particular to the flow channels through which the reactant gas flows inside the fuel cell.

BACKGROUND

In the field of fuel cells, a known construction includes a membrane electrode assembly (hereinafter termed "MEA") in which electrode layers stacked on an electrolyte member, and separators alternately, stacked with the MEA, which forms flow channels for conveying the reactant gas to the MEA.

One fuel cell proposed in the past with the aim of boosting the generating efficiency of the fuel cell by virtue of the shape of the flow channels for the reactant gas is provided with supply flow channels through which the reactant gas may flow from a gas supply port to the electrode faces of the MEA, and discharge flow channels through which off gas may flow from the electrode faces of the MEA to a gas discharge port, these channels respectively having pectinate form and being formed separately so as to mesh with one another (Patent Literature 1).

CITATION LIST

Patent Literature

Patent Literature 1: JP 11-16591 A

SUMMARY

Technical Problem

However, in the fuel cell of Patent Literature 1, because the discharge flow channels extend and pass through the entire area of the MEA electrode face, moisture present in the MEA is discharged at an excessive level from the MEA together with the off gas, creating the problem of diminished generating capabilities in dry environments.

In view of the problem, an advantage of some aspects of the invention is to provide a fuel cell having improved generating capabilities in dry environments.

Solution to Problem

An advantage of some aspects of the invention is intended to address this issue at least in part, and can be reduced to practice as described below.

(1st Aspect) A fuel cell according to a first aspect of the invention is a fuel cell for electrochemical generating electricity using reactant gas, the fuel cell including: a membrane electrode assembly that includes an electrolyte membrane to which an electrode layer stacked; and a separator that forms alternate first and second flow channels for conveying the reactant gas to the membrane electrode assembly, wherein the first flow channel is blocked in middle portion of the first flow channel, and second flow channel is blocked in both end portions of the second flow channel.

According to the fuel cell of the first aspect, by humidifying the reactant gas flowing from the upstream end in the first flow channel towards the second flow channel through the membrane electrode assembly while dehumidifying the reactant gas flowing from the downstream end in the second flow channel towards the first flow channel through the membrane electrode assembly, it is possible to limit the volume of moisture that will be expelled from the membrane electrode assembly together with the off gas. As a result, generating capabilities in dry environments can be improved.

(2nd Aspect) In the fuel cell according to the first aspect, the separator may include: an anode separator that forms the first and second flow channels as flow channels for conveying fuel gas to an anode side of the membrane electrode assembly; and a cathode separator that forms the first and second flow channels as flow channels for conveying oxidation gas to a cathode side of the membrane electrode assembly, wherein a flow direction of the fuel gas on the anode separator opposes a flow direction of the oxidation gas on the cathode separator. According to the fuel cell of the second aspect, because the fuel gas (anode gas) and the oxidation gas (cathode gas) are opposite flows, moisture will move from cathode gas which has been humidified by water evolved during electricity generation to anode gas flowing towards the second flow channel through the membrane electrode assembly from the upstream end in the first flow channel in the anode separator; and moisture will move from this anode gas having been humidified through movement of moisture, to cathode gas flowing towards the second flow channel through the membrane electrode assembly from the upstream end in the first flow channel in the cathode separator, whereby it will be possible to limit the amount of moisture that is expelled from the membrane electrode assembly together with the off gas.

(3rd Aspect) In the fuel cell according to the second aspect, the anode separator and the cathode separator may be the same component. According to the fuel cell of the third aspect, the design of the parts of the fuel cell can be simpler.

The invention is not limited to being embodied as a fuel cell, and may be reduced to practice in various other aspects such as a car which runs with electric power of a fuel cell, an electric generating system which provides electric power of a fuel cell, and a method for manufacturing a fuel cell. The invention should not be construed as limited to the embodiments set forth hereinabove, and naturally various modifications such as the following may be made herein without departing from the scope of the invention.

DESCRIPTION OF EMBODIMENT

In order to provide a better understanding of the constitution and advantages of the invention, a fuel cell according to an aspect of the invention will be described below.

Figure 1:
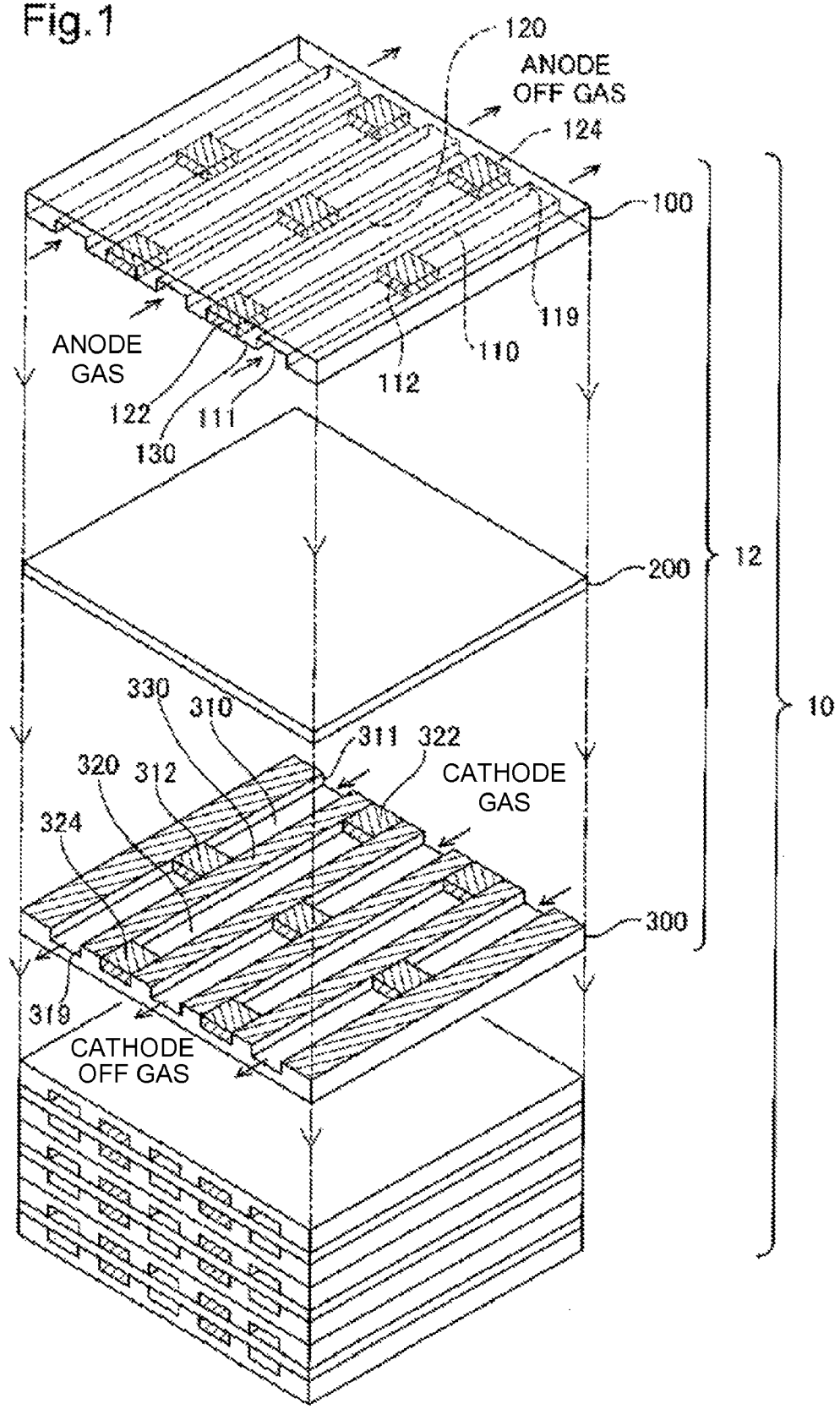
FIG. 1 is an illustration depicting in simplified form a configuration of a fuel cell.

FIG. 1 is an illustration depicting in simplified form a configuration of a fuel cell 10. The fuel cell 10 is designed to generate electricity through an electrochemical reaction of reactant gas supplied from a gas supply section (not shown) such as a tank or reformer. In the present embodiment, the fuel cell 10 is a solid polymer fuel cell. In the present embodiment, reactant gases used by the fuel cell 10 include a fuel gas containing hydrogen and an oxidation gas containing oxygen. The fuel gas used by the fuel cell 10 may be hydrogen gas which has been stored in a hydrogen tank or hydrogen-occluding alloy, or hydrogen gas obtained through reforming of a hydrocarbon fuel. The oxidation gas used by the fuel cell 10 may be air which has been drawn in from the outside, for example.

In the present embodiment, the fuel cell 10 is a fuel cell of recirculating design in which the fuel gas is recirculated for reuse. The fuel gas (anode gas) supplied to the fuel cell 10 experiences decreasing hydrogen concentration as the electrochemical reaction proceeds, and is then expelled out from the fuel cell 10 as anode off gas. In the present embodiment, the anode off gas is reused as the fuel gas. The oxidation gas (cathode gas) supplied to the fuel cell 10 experiences decreasing oxygen concentration as the electrochemical reaction proceeds, and is then expelled out from the fuel cell 10 as cathode off gas.

The fuel cell 10 is furnished with a cell 12 composed of an MEA 200 which has been stacked between an anode separator 100 and a cathode separator 300. In the present embodiment, the fuel cell 10 is composed of a plurality of stacked cells 12.

The MEA 200 of the fuel cell 10 has been formed by stacking electrode layers against both faces of an electrolyte membrane. The electrolyte membrane of the MEA 200 is composed of a proton conductor; in the present embodiment, it is a perfluorosulfonic acid ion exchange membrane 25 micrometers in thickness made of NAFION 112 (NAFION is a registered trademark of Dupont Corporation). The electrode layers of the MEA include a catalyst layer for accelerating the electrochemical reaction of the reactant gas, and a diffusion layer for diffusing the reactant gas into the catalyst layer. In the present embodiment, the catalyst layer of the electrode layer has been formed on the electrolyte membrane using a material that is a mixture of an ionomer resin and a catalyst supported on carbon, while the diffusion layer of the electrode layer has been formed on the catalyst layer using a porous carbon material.

The anode separator 100 and the cathode separator 300 of the fuel cell 10 function to circulate reactant gas to the MEA 200 and collect the electricity generated by the MEA 200. The anode separator 100 functions to circulate the anode gas to the anode side of the MEA 200, while the cathode separator 300 functions to circulate the cathode gas to the cathode side of the MEA 200. The material for the anode separator 100 and the cathode separator 300 should be endowed with electrical conductivity sufficient for collecting electricity, as well as with durability, heat resistance, and gas impermeability sufficient for circulation of the reaction gas to the MEA 200. In the present embodiment, the material for the anode separator 100 and the cathode separator 300 is a carbon resin; however, in an alternative embodiment it could be stainless steel, titanium, titanium alloy, or conductive ceramic. In the present embodiment, the anode separator 100 and the cathode separator 300 have been designed as separate; however, in an alternative embodiment, a unified design for the anode separator 100 and the cathode separator 300 could be employed.

In the anode separator 100 of the fuel cell 10 there have been laid out alternate first flow channels 110 which are blocked in the middle portion, and second flow channels 120 which are blocked at both ends, with the first flow channels 110 and the second flow channels 120 separated by ribs 130. The first flow channels 110 are flow channels of groove form blocked off in the middle portion by an occluding member 112. The first flow channels 110 at a first end thereof define anode flow inlets 111 for inflow of anode gas, while the first flow channels 110 at their other end define anode flow outlets 119 for the outflowing anode gas. In the second flow channels 120 the end thereof lying on the side at which anode gas flows into the anode separator 100 is blocked by an occluding member 122, while the end lying on the side at which anode gas outflows from the anode separator 100 is blocked by an occluding member 124. In the present embodiment, the occluding members 112, 122, 124 have been provided as separate members from the anode separator 100 body, but in an alternative embodiment these could be integrally formed with the anode separator 100 body. In the present embodiment, the width and depth of the first flow channels 110 and the second flow channels 120, the width of the ribs 130, and the width of the occluding members 112, 122, 124 are 1 millimeter (mm) each.

In the cathode separator 300 of the fuel cell 10 there have been laid out alternate first flow channels 310 which are blocked in the middle portion, and second flow channels 320 which are blocked at both ends, with the first flow channels 310 and the second flow channels 320 separated by ribs 330. The first flow channels 310 are flow channels of groove form blocked off in the middle portion by an occluding member 312. The first flow channels 310 at a first end thereof define cathode flow inlets 311 for inflow of cathode gas, while the first flow channels 310 at their other end define cathode flow outlets 319 for the outflowing cathode gas. In the second flow channels 320 the end thereof lying on the side at which cathode gas flows into the cathode separator 300 is blocked by an occluding member 322, while the end lying on the side at which cathode gas outflows from the cathode separator 300 is blocked by an occluding member 324. In the present embodiment, the occluding members 312, 322, 324 have been provided as separate members from the cathode separator 300 body, but in an alternative embodiment these could be integrally formed with the cathode separator 300 body. In the present embodiment, the width and depth of the first flow channels 310 and the second flow channels 320, the width of the ribs 330, and the width of the occluding members 312, 322, 324 are 1 millimeter each. In the present embodiment, the anode separator 100 and the cathode separator 300 are identical components.

With the anode separator 100 and the cathode separator 300 having been stacked against the MEA 200, the anode flow inlets 111 of the anode separator 100 will be situated in opposition to the cathode flow outlets 319 of the cathode separator 300 with the MEA 200 between them; and the cathode flow inlets 311 of the cathode separator 300 will be situated in opposition to the anode flow outlets 119 of the anode separator 100 with the MEA 200 between them. That is, the direction of flow of anode gas in the anode separator 100 will be opposite to the direction of flow of cathode gas in the cathode separator 300.

Figure 2:
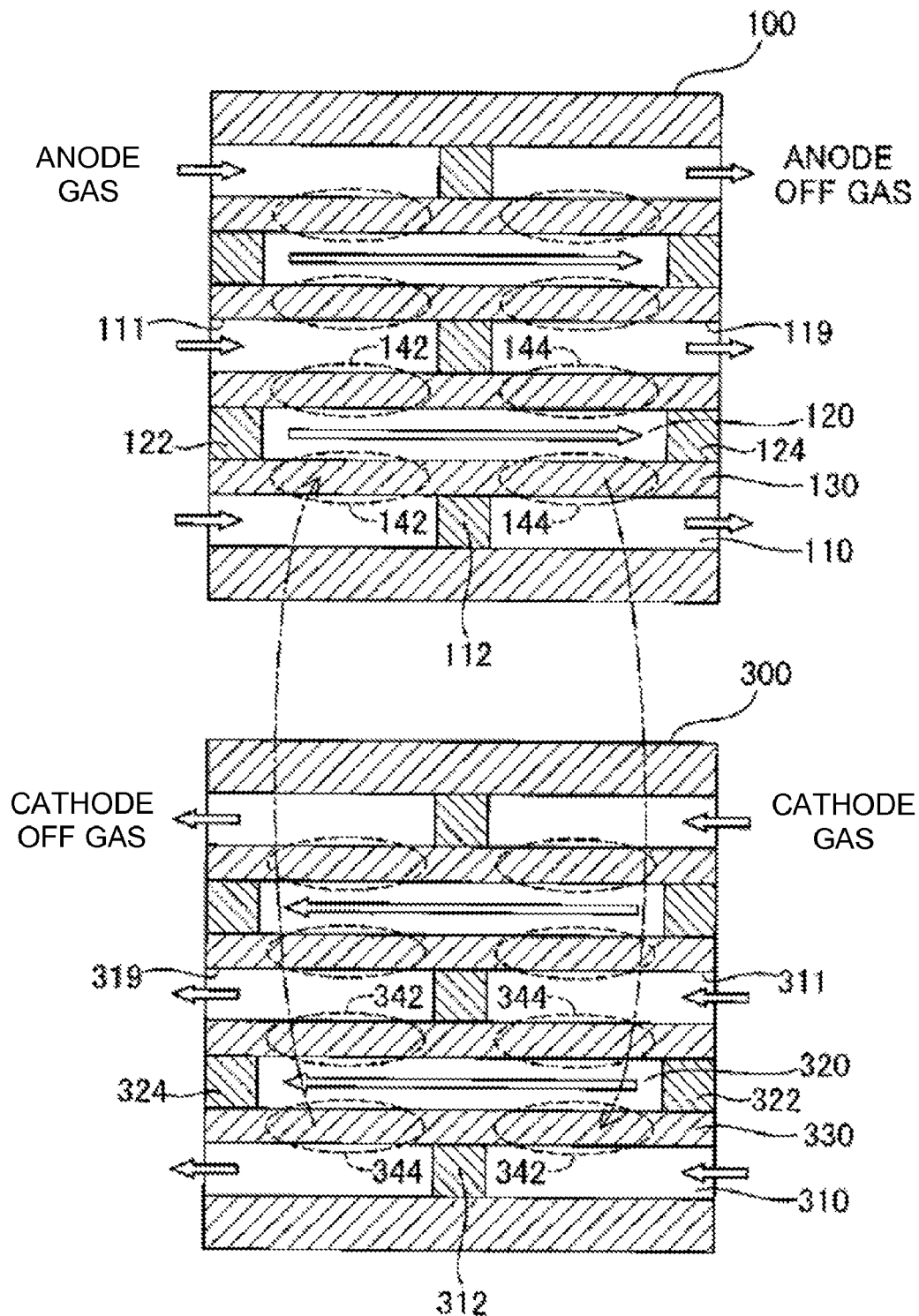
FIG. 2 is an illustration mainly depicting flow of reactant gas in the fuel cell.

FIG. 2 is an illustration mainly depicting flow of reactant gas in the fuel cell 10. In FIG. 2, the flow arrangements in the anode separator 100 and the cathode separator 300 are depicted in forms respectively projected in the direction facing the fuel cell 10 from the anode separator 100 side.

After inflowing from the anode flow inlet 111 in the first flow channel 110 (Flow state A1), the anode gas in the anode separator 100 diffuses towards the MEA 200 from the space to the upstream side of the occluding member 112 in the first flow channel 110 (Flow state A2). Subsequently, the anode gas having diffused from the first flow channel 110 into the MEA 200 will move through the MEA 200 below a rib upstream portion 142 in the rib 130, inflowing to the upstream side in the second flow channel 120 (Flow state A3) and flowing towards the downstream side in the second flow channel 120 (Flow state A4). Then, the anode gas in the second flow channel 120 will diffuse towards the MEA 200 from the downstream side in the second flow channel 120 (Flow state A5). Subsequently, the anode gas having diffused from the second flow channel 120 into the MEA 200 will move through the MEA 200 below a rib downstream portion 144 in the rib 130 and inflow to the space to the downstream side of the occluding member 112 in the first flow channel 110 (Flow state A6). Then, the anode gas to the downstream side in the first flow channel 110 will flow out from the anode flow outlet 119 in the first flow channel 110 (Flow state A7).

After inflowing from the cathode flow inlet 311 in the first flow channel 310 (Flow state C1), the cathode gas in the cathode separator 300 will diffuse towards the MEA 200 from the space to the upstream side of the occluding member 312 in the first flow channel 310 (Flow state C2). Subsequently, the cathode gas having diffused from the first flow channel 310 into the MEA 200 will move through the MEA 200 below a rib upstream portion 342 in the rib 330, inflowing to the upstream side in the second flow channel 320 (Flow state C3) and flowing towards the downstream side in the second flow channel 320 (Flow state C4). Then, the cathode gas in the second flow channel 320 will diffuse towards the MEA 200 from the downstream side in the second flow channel 320 (Flow state C5). Subsequently, the cathode gas having diffused from the second flow channel 320 into the MEA 200 will move through the MEA 200 below a rib downstream portion 344 in the rib 330 and inflow to the space to the downstream side of the occluding member 312 in the first flow channel 310 (Flow state C6). Then, the cathode gas to the downstream side in the first flow channel 310 will flow out from the cathode flow outlet 319 in the first flow channel 310 (Flow state C7).

The rib upstream portions 142 of the anode separator 100 are situated at locations in opposition to the rib downstream portions 344 of the cathode separator 300 with the MEA 200 therebetween; and the rib upstream portions 342 of the cathode separator 300 are situated at locations in opposition to the rib downstream portions 344 of the anode separator 100 with the MEA 200 therebetween. Cathode gas that has flowed into the second flow channels 320 in the cathode separator 300 (Flow state C4) becomes humidified by evolved water that has been evolved in the electricity generation reaction in the MEA 200, and the moisture moves via the MEA 200 from cathode gas diffusing below the rib downstream portions 344 of the cathode separator 300 (Flow state C5) to anode gas diffusing below the rib upstream portions 142 of the anode separator 100 (Flow state A2). Anode gas that has flowed into the second flow channels 120 in the anode separator 100 (Flow state A4) becomes humidified through moisture moving from the cathode gas, and the moisture moves via the MEA 200 from anode gas diffusing below the rib downstream portions 144 of the anode separator 100 (Flow state A5) to cathode gas diffusing below the rib upstream portions 342 of the cathode separator 300 (Flow state C2).

Figure 3:
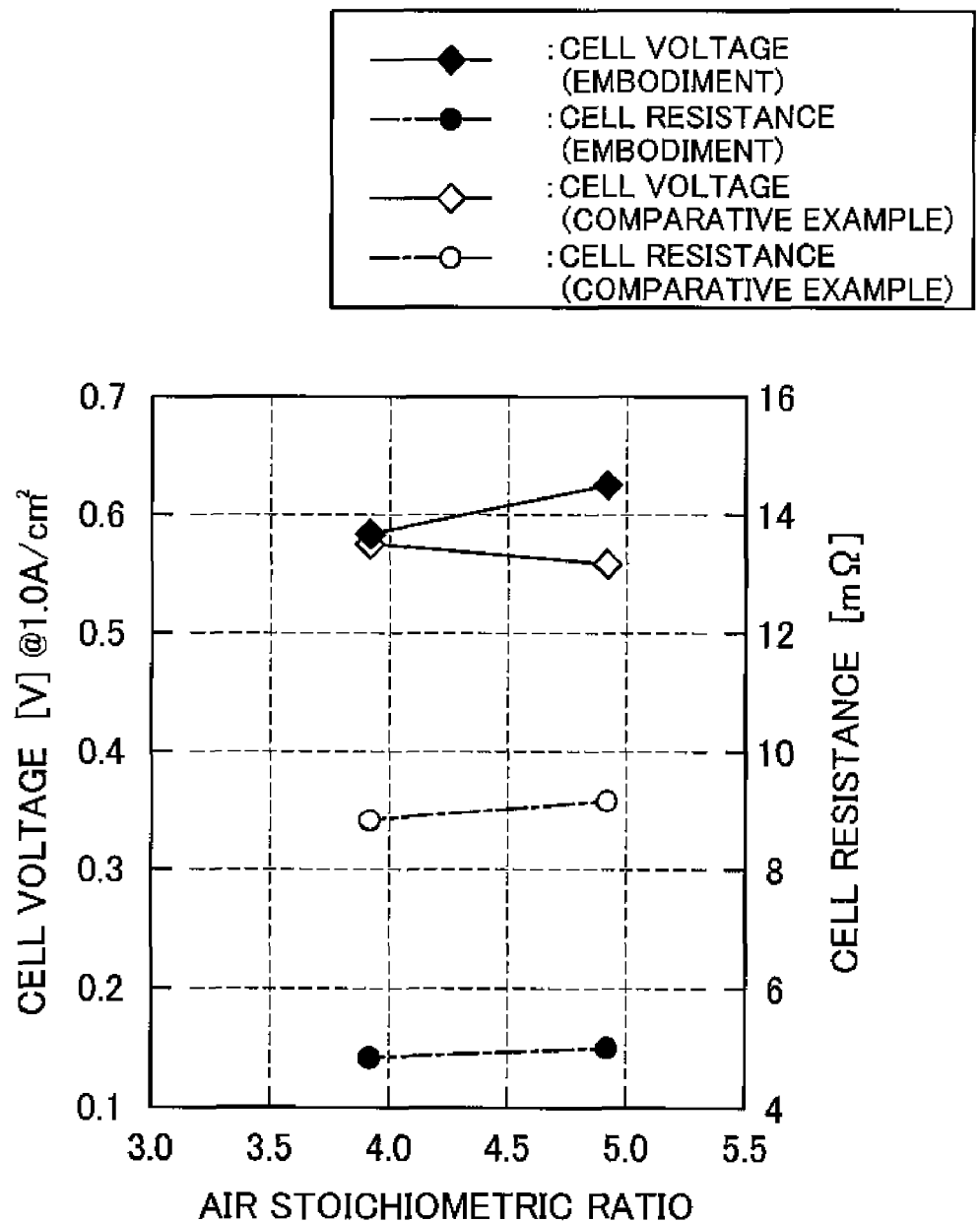
FIG. 3 is an illustration depicting experimental values of cell voltage and cell resistance in the embodiment and in a comparative example.
Figure 4:
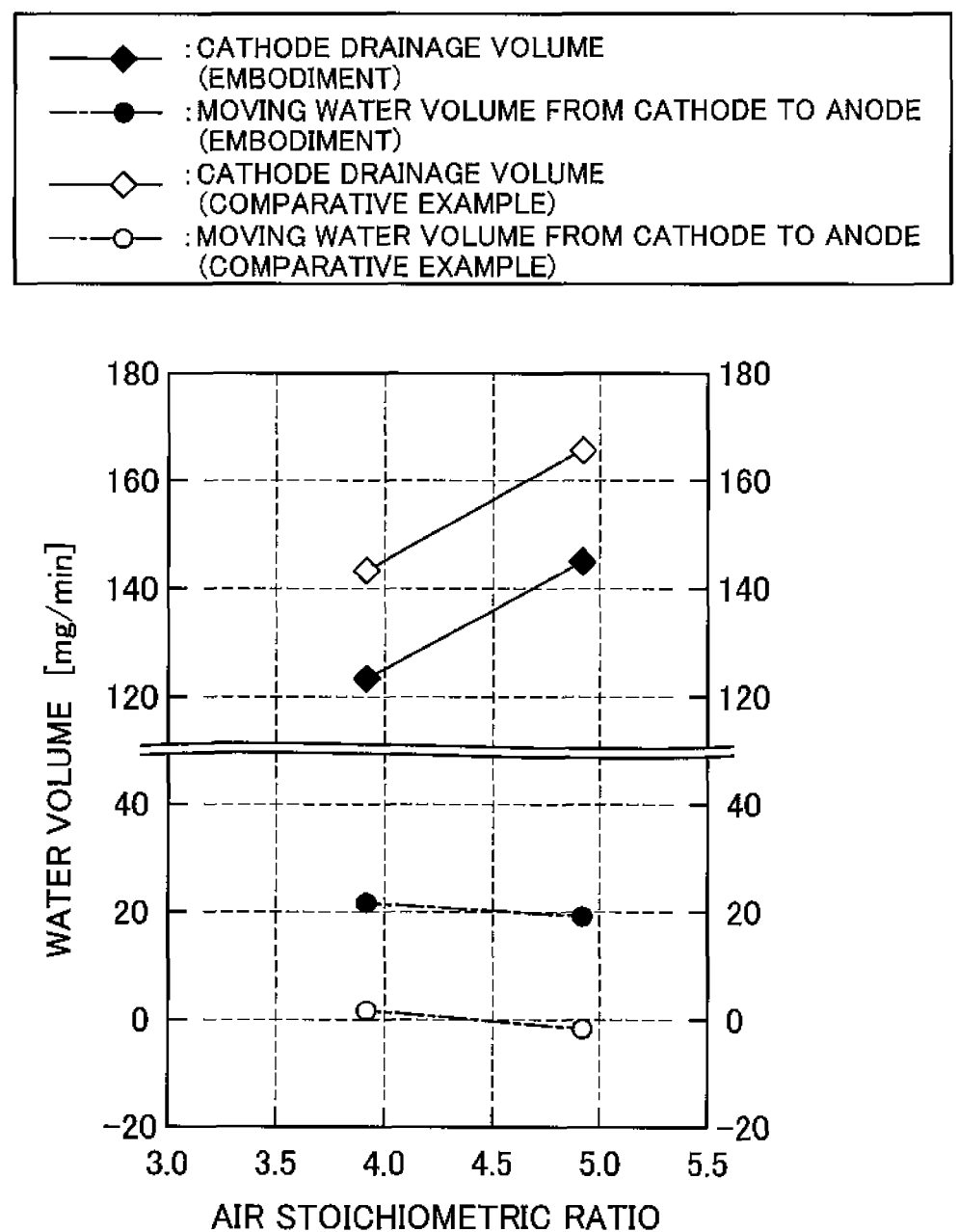
FIG. 4 is an illustration depicting experimental values of cathode drainage volume and moving water volume in the embodiment and in a comparative example.

FIG. 3 is an illustration depicting experimental values of cell voltage and cell resistance in the embodiment and in a comparative example. FIG. 4 is an illustration depicting experimental values of cathode drainage volume and moving water volume in the embodiment and in a comparative example.

For the embodiment shown in FIGS. 3 and 4, a cell 12 furnished with an anode separator 100 and a cathode separator 300 made of carbon was prepared. In the anode separator 100 and the cathode separator 300 of the cell 12 of the present embodiment, flow channels blocked by a rib in their middle portion and flow channels blocked by ribs at both ends were laid out alternately, with flow channel width, flow channel depth, and rib width each being 1 millimeter.

For the comparative example shown in FIGS. 3 and 4, a cell furnished with an anode separator and a cathode separator made of carbon was prepared. In the anode separator and the cathode separator of the cell the comparative example, flow channels blocked at the inlet side by a rib and flow channels blocked at the outlet side by a rib were laid out alternately, with flow channel width, flow channel depth, and rib width each being 1 millimeter.

The MEA of each of the cells in FIGS. 3 and 4 had an electrolyte membrane made of Dupont NAFION 112 25 micrometers ($\mu$m) in thickness, and the electrode face surface area of the MEA 13 was square centimeters ($cm^2$). In the embodiment and comparative example in FIGS. 3 and 4, the temperature of the cells was adjusted to 80° C., and current density of 1.0 amperes/square centimeter ($A/cm^2$) was generated. The cells of the embodiment and comparative example were supplied with a fuel gas of hydrogen at 60 percent humidity and a hydrogen stoichiometric ratio of 5, and with an oxidation gas of air at 60 percent humidity and an air stoichiometric ratio of about 4 or about 5. The results depicted in FIGS. 3 and 4 were obtained.

As shown in FIG. 3, when the air stoichiometric ratio was about 4 or about 5, the cell 12 of the embodiment exhibited lower cell resistance than the comparative example, demonstrating that higher cell voltage that the cell of the comparative example was obtained. A possible cause for the lower cell resistance observed in the embodiment than in the comparative example is that the electrolyte membrane in the embodiment was moister than that in the comparative example due to the greater moving water volume from the cathode to the anode in the embodiment than in the comparative example, as depicted in FIG. 4. As shown in FIG. 4, it will be appreciated that because the moving water volume from the cathode to the anode in the embodiment is greater than in the comparative example, the cathode drainage volume is smaller than in the comparative example.

According to the fuel cell 10 described hereinabove, moisture can be moved from the cathode gas on the downstream side to the anode gas on the upstream side (Steps C5, A2), and moisture can be moved from the anode gas on the downstream side to the cathode gas on the upstream side (Steps A5, C2). As a result, generating capability in dry environments can be improved.

The foregoing description of the invention based on certain embodiments should not be construed as limiting of the invention, and various modifications will of course be possible without departing from the scope of the invention.

The invention claimed is:
1. A fuel cell for electrochemically generating electricity using reactant gas, comprising:
a membrane electrode assembly that includes an electrolyte membrane to which an electrode layer stacked; and a separator that forms alternate first and second flow channels for conveying the reactant gas to the membrane electrode assembly,
wherein the first flow channel is blocked in middle portion of the first flow channel, and second flow channel is blocked in both end portions of the second flow channel.

2. The fuel cell according to claim 1,
wherein the separator comprises:
an anode separator that forms the first and second flow channels as flow channels for conveying fuel gas to an anode side of the membrane electrode assembly; and
a cathode separator that forms the first and second flow channels as flow channels for conveying oxidation gas to a cathode side of the membrane electrode assembly,
wherein a flow direction of the fuel gas on the anode separator opposes a flow direction of the oxidation gas on the cathode separator.

3. The fuel cell according to claim 2, wherein the anode separator and the cathode separator have the same configuration.

* * * * *